United States Patent [19]

Marsh

[11] Patent Number: 5,141,059
[45] Date of Patent: Aug. 25, 1992

[54] METHOD AND APPARATUS FOR CONTROLLING AGRICULTURAL PESTS IN SOIL

[76] Inventor: Leland C. Marsh, R.R. 1, Box 128, Castalia, Iowa 52133

[21] Appl. No.: 661,905

[22] Filed: Feb. 27, 1991

[51] Int. Cl.$^5$ ............................................. A01B 35/00
[52] U.S. Cl. ....................................... 172/1; 172/776; 47/1.3; 204/157.43
[58] Field of Search .......................... 172/1, 776, 438; 111/118, 127; 405/128, 258; 166/248; 219/201, 10.55 R, 10.55 A, 10.55 M; 47/1.3, 1.42, 1.43, DIG. 12; 204/157.43

[56] References Cited

U.S. PATENT DOCUMENTS

| | | | |
|---|---|---|---|
| 3,307,289 | 3/1967 | Lemm | 47/1.3 X |
| 3,902,273 | 9/1975 | Friedman | 47/DIG. 12 X |
| 4,043,048 | 8/1977 | Veater | 34/202 X |
| 4,092,800 | 6/1978 | Wayland, Jr. et al. | 47/1.3 |
| 4,370,534 | 1/1983 | Brandon | 219/10.55 D X |
| 4,873,789 | 10/1989 | Plattner | 47/1.42 |

FOREIGN PATENT DOCUMENTS 3804052 8/1989 Fed. Rep. of Germany ......... 47/1.3
538673 1/1977 U.S.S.R. ............................. 47/1.3

OTHER PUBLICATIONS

Yeomans, Alfred H., "Radiant Energy and Insects," Yearbook of Agriculture 1952, pp. 411–421.
McKinney, John, "New Horizons in Weed Control," Progressive Farmer, Jan. 1973, pp. 26–27.
Davis, J. H., "Radio Waves Kill Insect Pests," Scientific American, vol. 148, May 1933, pp. 272–273.

Primary Examiner—Randolph A. Reese
Assistant Examiner—Jeffrey L. Thompson
Attorney, Agent, or Firm—James C. Nemmers

[57] ABSTRACT

A method and apparatus for controlling agricultural pests in soil by the use of microwave energy. By using an agricultural-type implement for the controlled application of microwave energy to the topsoil prior to the planting of crops, germination of weed and other seeds is inhibited and insects are destroyed. Use of microwave energy has no residual effects, thereby practically eliminating any adverse effects on the environment.

13 Claims, 3 Drawing Sheets

METHOD AND APPARATUS FOR CONTROLLING AGRICULTURAL PESTS IN SOIL

BACKGROUND OF THE INVENTION

In recent years, concern for the environment has become increasingly important, not only in the cities, but in rural areas as well. Much of the environmental concern in rural areas is centered on toxic chemicals leaching into rivers, lakes and groundwater as a result of the application of pesticides to the soil. Attempts at resolving this problem of polluting our fresh water sources have not been effective. A few chemicals have been banned, and some warnings have been issued and penalties assessed. However, no one has attempted to solve the problem with a solution that would offer an alternative to agricultural chemical pesticides.

Today's farmer is typically a well educated person with a concern for the environment. The farmer is also concerned with his own personal health and well-being, but is constantly under economic pressure to produce the highest yields possible from the farmland. This pressure results in the farmer using whatever modern technology offers to assist him in achieving higher yields. However, farmers are also concerned about living and working in an environment in harmony with their fellow man, who are increasingly concerned about residual chemicals in their food products. To achieve his goals of higher yields and preservation of the environment, most farmers are quite capable of, and will use, available high-tech advancements, especially if they will improve the efficiency of the farming operation and result in increased profits.

Therefore, there is a need for improved farming methods and techniques that will have less adverse effects on the environment without affecting the efficiency of farming operations.

There is a further need for improved ways of minimizing or eliminating agricultural pests without the use of chemical pesticides which are harmful to the environment There is a specific need for environmentally safe ways of controlling weeds and insects that will leave a chemical-free seed bed for unincumbered crop growth in farming operations.

SUMMARY OF THE INVENTION

The invention utilizes microwave energy directed into the depth-growing area of crop fields to destroy weed, plant and insect cells prior to planting of the crop. The microwave energy is applied from an apparatus that includes a tillage unit which loosens the topsoil and levels it prior to application of the microwave energy. The apparatus has a portable power source for the microwave generators and includes means to confine the microwaves within the area to be treated.

DESCRIPTION OF THE PREFERRED EMBODIMENT OF THE INVENTION

The method and apparatus of the invention utilizes the principles of microwave energy to accomplish the purpose of the invention to eliminate agricultural pests. As used herein, "pest" refers to anything that inhibits growing crops and includes seeds, roots, plants and insects. When microwave energy is emitted from a microwave generator or magnetron tube, it is reflected by, absorbed in or transmitted through any object in its path. The particular effect on the object depends upon several factors, including the object's dielectric coefficient, its shape and the amount of moisture contained in the object. Generally, most metals will reflect microwave energy whereas glass, paper and most plastics are transparent to microwaves. On the other hand, materials such as food, liquids and other lossy dielectrics will absorb the microwave energy to varying degrees and convert the energy to heat. This conversion takes place because the microwaves interact with the material's atoms and molecules. Microwave heating offers several unique advantages over other types of heating, such as convection or conduction. Microwave energy is absorbed only by the load, and therefore none of it is wasted on heat transfer media such as oil, water or air. Moreover, microwave heating can be turned on or off instantaneously.

The method and apparatus of the invention utilize these unique properties of microwave energy for substantially eliminating agriculture pests. Microwave energy destroys plant molecular cell structure thereby inhibiting the plant's ability to take up water and to utilize nutrients and life-sustaining substances. The amount of energy needed to cause plant death is not very great due to the plant's moist nature and delicate structure.

Figure 1:
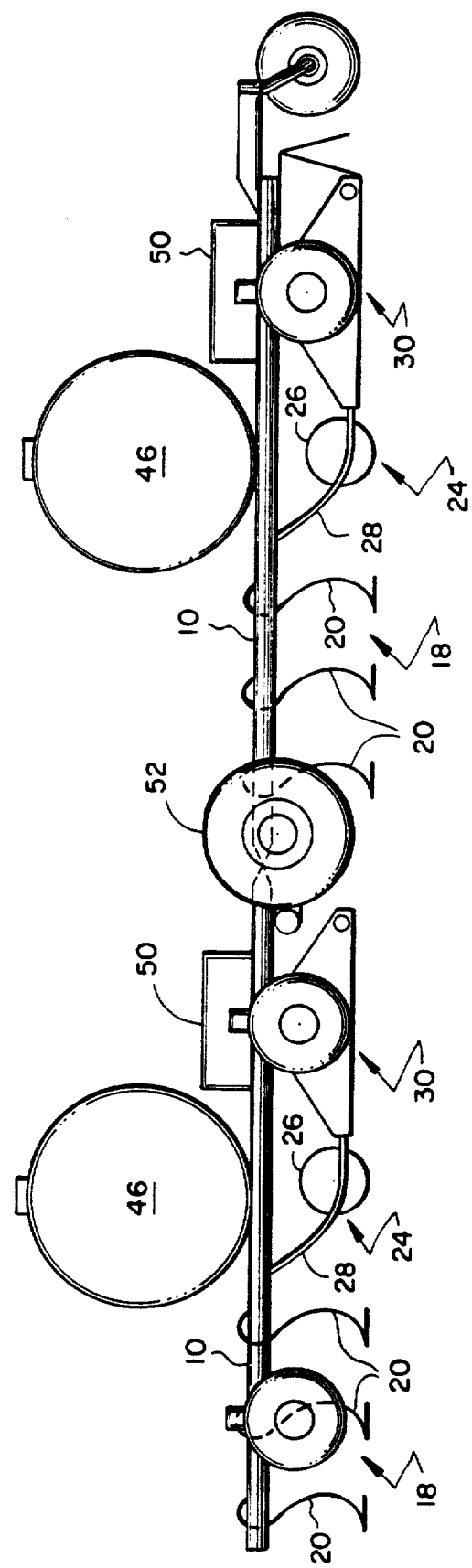
FIG. 1 is a side elevational view illustrating two implements connected in tandem and constructed to carry out the principles of the invention.
Figure 2:
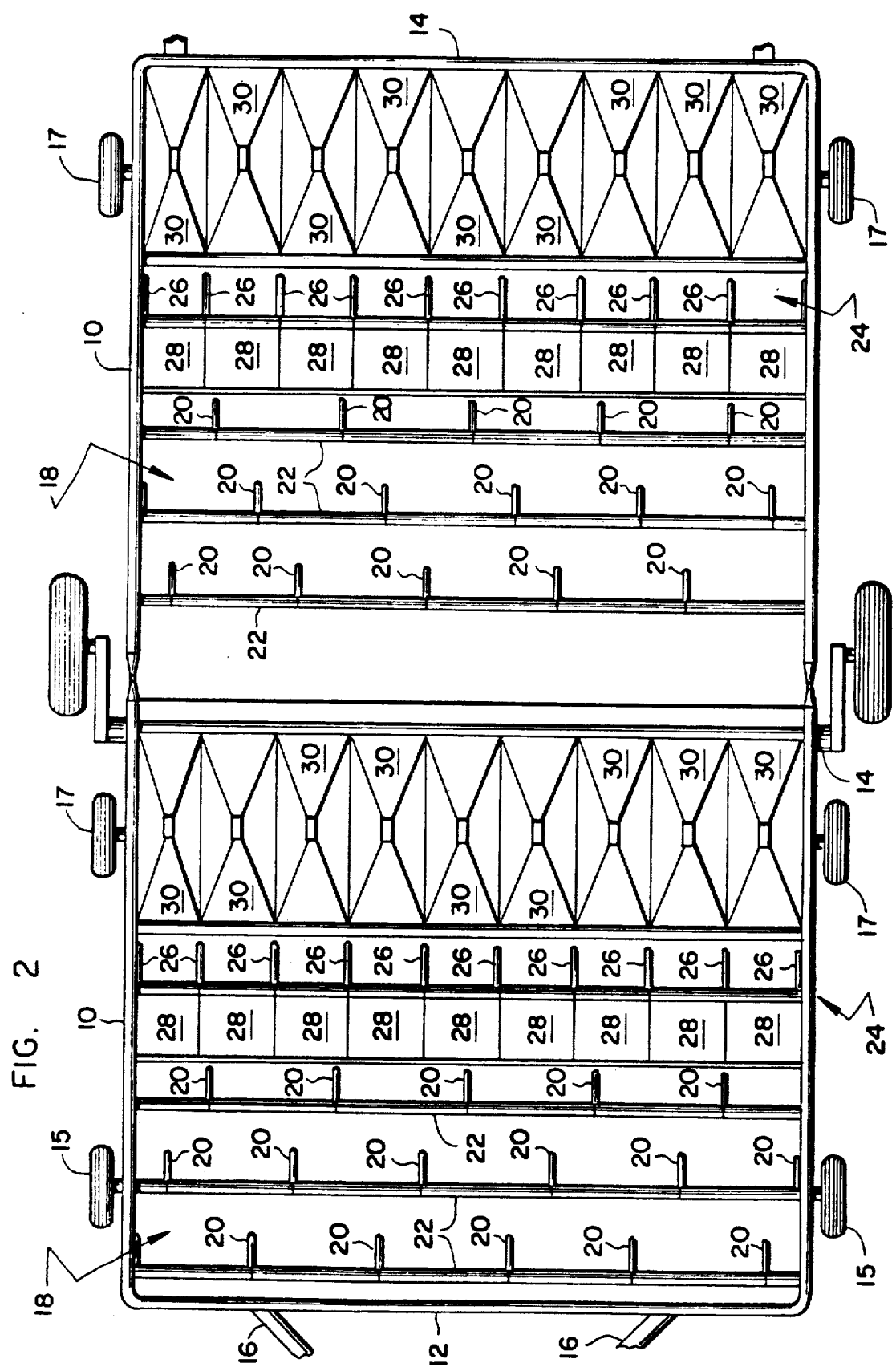
FIG. 2 is a top or plan view of the implements of FIG. 1.

Referring now to the drawings, there are illustrated the basic components of an apparatus for carrying out the invention by applying microwave energy to the topsoil prior to planting of the crops. The principles of the invention can also be utilized during the early growth stages of the crops, if desired. In FIGS. 1 and 2, there are illustrated two implements which are constructed according to the principles of the invention. The implements are shown as being connected in tandem, and it will be understood that these two implements can be connected in any suitable manner to a tractor or other prime mover so that the implements can be pulled over and across the fields to be treated in the same manner as other agricultural implements. Each of the implements of FIG. 1 has longitudinal main frame members 10 connected by a front cross member 12 and a rear cross member 14. The frame members 10, 12 and 14 are supported on front ground wheels 15 and rear ground wheels 17, which wheels serve to maintain the proper height of the implements. Front member 16 is provided with a tongue or other forwardly extending frame that provides for attachment of the implement to the tractor in any of several well-known ways.

Connected to the main frame members 10 near the front cross member 12 is a tillage unit indicated generally by the reference numeral 18. The tillage unit 18 can be of any standard design that includes a plurality of spring teeth 20 supported on cross members 22 with the spring teeth 20 on each member 22 spaced in an offset manner so that the teeth will penetrate and agitate the soil preferably to a depth of three inches.

Immediately following the tillage unit 18 are a plurality of leveling units 24 which extend the full width of the implement as illustrated in FIG. 2. Each of the leveling units 24 is a flat sled-like member that has an upturned front portion 28. A coulter 26 is positioned between each leveling unit 24 and serves to cut a path in the soil for the runners 38 of the sterilizing units 30 that follow the leveling units 24. As leveling units 24 pass over the soil, they will level the soil and smooth out any ridges in preparation for the passage of the sterilization unit, which is indicated in the drawings by the reference numeral 30.

Figure 3:
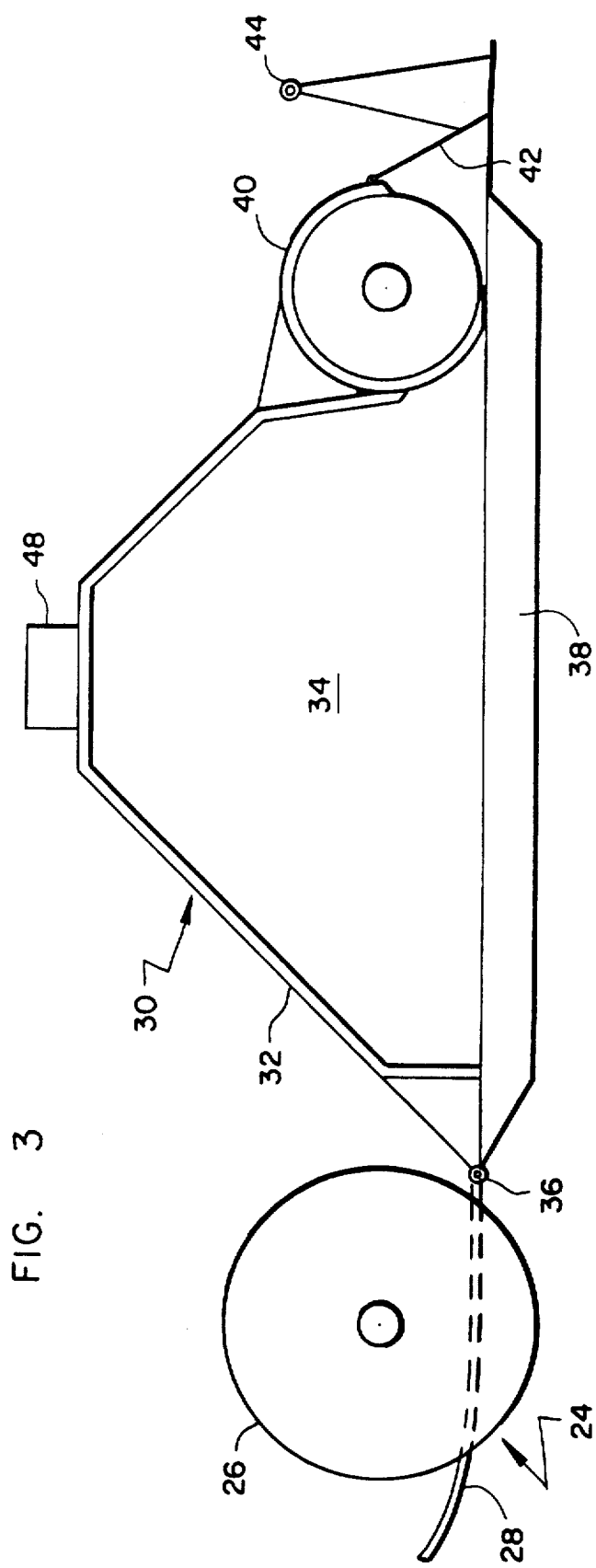
FIG. 3 is a side elevational view illustrating one of the microwave units that forms a part of the apparatus of the invention.

FIG. 3 is an enlarged view of a sterilization unit 30 which has a housing 32 open at the bottom that defines an energy chambers 34. The housing 32 preferably is connected to the leveling unit 24 in a manner so as to utilize the leveling unit 24 as an energy seal along the front of the housing 32. The connection between the leveling unit 24 and housing 32 is preferably a pivotal connection provided by a flex-hinge 36. As illustrated in FIG. 2, the width of the housing 32 is the same as the width of each leveling unit 24, both of these units being sized to standard row crop widths used in current farming practices. Preferably, however, the precise width of the leveling unit 24 and housing 32 is slightly less than the standard row crop width so that the apparatus could also be used during a post-crop emergence period as a cultivation and pest control measure.

Attached to the sides of the housing 32 are runners 38 which extend the full length of the housing 32 and beyond to the rear seal described hereinafter. The runners 38 extend downwardly into the soil to the depth that is to be treated, e.g. three inches. The runners 38 are preferably made of wear-resistant material that is also capable of reflecting the microwave energy thereby providing seals on both sides of the energy chamber 34.

In order to seal the rear of the energy chamber 34, there is preferably provided a drum 40 the periphery of which is fluted so as to seal upon contact with the ground and with the housing 32 to minimize the leakage of microwave energy. To provide a further seal at the rear of chamber 34, there is preferably mounted a flexible, energy-absorbing baffle 42 to the rear of drum 40, and in addition, a spray bar 44 is mounted to the rear of the baffle 42 to provide a continuous spray of water during the time that the microwave energy is being emitted. In order to supply water to spray bar 44, a water tank 46 is mounted on frame members 10 and 12.

To supply microwave energy and direct it to the ground beneath the energy chamber 34, a microwave generator 48 is mounted at the top of each housing 32. The microwave generator 48 is commonly a magnetron although amplitrons and klystrons may also be used. Power to the microwave generators 48 is supplied from an electrical generator 50 also mounted on the frame members 10 and 12, which generator 50 is powered from the typical farm tractor towing the apparatus of the invention.

The microwave generators 48 will emit a constant high density microwave charge into the soil beneath the energy chambers 34. This causes molecular cell damage to all seed, rhizome, roots and insects to a depth of three inches in the soil. As previously indicated, two identical implements are connected in tandem to repeat the application of the microwave energy and thereby ensure complete coverage of the soil over which the implements pass.

Also, the leveling units 24 and sterilizing units 30 are preferably individually flex-hinged to the frame members 10 so that they will follow the contour of the ground and thereby provide constant contact with the soil and minimize any microwave leakage. Since the apparatus of the invention will normally be operated only in open fields, and since microwave energy dissipates rapidly, there should be little concern for safety, especially with the provision of the seals as described herein to minimize the leakage of microwaves. However, if desired, microwave energy loss-detectors may be placed at strategic positions around each energy chamber 34 to detect excessive microwave leakage, and if such excessive leakage should occur, the detectors will cause the power to the microwave generators 48 to be disconnected.

FIGS. 1 and 2 also illustrate the tandem implements which may be supported by additional wheels 52 at the point of connection and at the rear to provide for transportation of the implement from place to place.

Laboratory tests on the use of microwaves for a variety of weeds and grasses have been successful. Tests on foxtail, velvetleaf, quackgrass, wirestem mulley, volunteer corn, volunteer oats and alfalfa have shown nearly 100% success rates in prevention of seed germination. The tests proved that a seed in the prime germination state, conditions that would exist at preplant of crops, will provide an optimum time to use microwave energy to sterilize the seeds and eliminate germination.

The use and operation of the apparatus of the invention should be evident from the foregoing description. However, the operation is summarized as follows. With a single implement, or two implements in tandem connected to a prime mover, such as a farm tractor, and with power being supplied to the microwave generators 48, the soil will first be loosened and tilled to a depth of three inches by the tillage units 18. As the implements continue to pass over an area, the tilled soil will be leveled and smoothed by the leveling units 24 in preparation for the application of the microwave energy from the energy chamber 34, which will destroy the pest in the top soil.

It is estimated that if the implements of the invention are towed at an average speed of 5 mph, approximately 8 acres of land can be treated per hour. Compared to the cost of chemical application, the cost of operating the apparatus of the invention is a fraction of the cost of chemical treatment. More importantly, use of the method and apparatus of the invention will cause no crop damage, and no carry-over to future years. Moreover, there will be no adverse effect to any organic or bacterial growth below the three inch topsoil treated using the method and apparatus of the invention. Soil aerators and humus digesters, such as worms and ants, are not affected below three inches. Effects on the environment are vastly improved over the application of chemicals which can leach into ground water, ponds, rivers and streams, contaminating the environment.

Moreover, by destroying all weed and other seeds and insects within the top three inch layer of soil during preplanting use, increased yields of crops can be expected. Also, by inhibiting or destroying seed germination, seeds for undesirable weeds, such as quack and wirestem mulley, will be destroyed even though there are few chemicals which will destroy these weeds.

Although the method and apparatus of the invention is designed primarily for preplanting use, it can be also used as a complete ground kill on hay ground and pasture land for either renovation or for rotation to other crops. Because each of the leveling units 24 and sterilization units 30 are independently mounted, flexibility in use is also provided, especially for field cultivation when crops are in the cultivation stages and it is desired to use a second sterilization of the soil between rows. Also, the method and apparatus of the invention can be used for ground kill and for grape vineyards, orchards, or any other application in which the plantings are spaced in rows.

The method and apparatus of the invention may have uses beyond agricultural uses. The principles of the invention, with slight modifications to the apparatus described herein, could be used for snow and ice removal on highways and airports runways. This would eliminate the use of expensive and harmful salt and other chemical applications presently used in these situations.

Obviously, by the elimination of the use and handling of toxic chemicals now presently used to accomplish pest control, farmers need not worry about chemical drift on windy days or be concerned about livestock, children or pets going on land immediately after treatment. Moreover, the elimination of the use of toxic chemicals eliminates hazardous storage problems as well as the concerns of clean-up of chemical spills.

Having thus described the invention in connection with a preferred embodiment thereof, it will be evident to those skilled in the art that various revisions and modifications can be made to the preferred embodiment of the method and apparatus described herein without departing from the spirit and scope of the invention. It is my intention however that all such revisions and modifications that would be evident to persons skilled in the art will be included within the scope of the following claims.

What is claimed is as follows:

1. A mobile apparatus for controllably applying microwave energy to a ground surface, said apparatus comprising a mobile chassis movable over the ground, a plurality of housings defining energy chambers supported by and positioned side-by-side on the chassis, a microwave generator in each of the energy chambers to produce microwave energy, mobile means movable with the chassis to generate power for the microwave generators, and each housing providing means to confine substantially all the microwave energy within the chamber and direct the energy toward the ground surface, said means including microwave-reflecting shields along each side of the housing which shields are engageable with the ground surface, and a roller extending across the width of and to the rear of the housings, the roller being engageable with the ground surface and the housing to provide an additional seal against microwave leakage from the chambers.

2. The mobile apparatus of claim 1 in which a liquid spray bar extends across the width of the housings and is mounted to the rear of the roller to direct liquid toward the ground surface, and means is provided to supply liquid under pressure to the spray bar so as to provide an additional seal against microwave leakage from the chambers.

3. A mobile apparatus for controllably applying microwave energy to a ground surface so as to control agricultural pests in the soil, said apparatus comprising a mobile chassis movable over the ground, a plurality of housings defining energy chambers supported by and positioned side-by-side on the chassis, means mounted ahead of the housings for loosening the soil to a predetermined depth and then leveling the loosened soil, a microwave generator in each of the energy chambers to produce microwave energy, each housing providing means to confine substantially all the microwave energy within the chamber and direct the energy toward the ground surface, and mobile means movable with the chassis to generate power for the microwave generators.

4. The mobile apparatus of claim 3 for use in controlling agricultural pests in soil and in which the means for leveling the soil includes independent leveling units each approximately the same width as a housing.

5. The mobile apparatus of claim 4 for use in controlling agricultural pests in soil and in which the leveling units each includes a sled-like member engageable with the loosened soil.

6. The mobile apparatus of claim 5 for use in controlling agricultural pests in soil and in which the leveling units are operatively connected to the front of the housings in a manner so as to provide a seal against leakage of microwave energy from the chambers.

7. The mobile apparatus of claim 6 for use in controlling agricultural pests in soil and in which each housing includes microwave-reflecting shields along each side of the housing extending into the ground approximately the same depth as the depth to which the soil is loosened by the soil loosening means, and there is provided a coulter between each of the leveling units to create a path in the loosened soil for the shields.

8. The mobile apparatus of claim 7 for use in controlling agricultural pests in soil and in which a roller extends across the width of and to the rear of the housings, the roller being engageable with the ground surface and the housing to provide an additional seal against microwave leakage from the chambers.

9. The mobile apparatus of claim 8 for use in controlling agricultural pests in soil and in which a flexible baffle extends across the width of the housings and to the rear of the roller, the baffle being engageable with the ground and constructed of material capable of absorbing microwave energy.

10. The mobile apparatus of claim 9 for use in controlling agricultural pests in soil and in which a liquid spray bar extends across the width of the housings and is mounted to the rear of the roller to direct liquid toward the ground surface, and means is provided to supply water under pressure to the spray bar so as to provide an additional seal against microwave leakage from the chambers.

11. A method for controlling agricultural pests below the ground in the soil of agricultural fields, said method comprising: moving tillage means over the ground to loosen the soil to a predetermined depth; leveling the loosened soil before it again hardens so as to provide a layer of the loosened soil of substantially uniform depth; and moving microwave generators over the loosened soil and causing microwave energy to be directed into the loosened soil to its predetermined depth and for a predetermined amount of time to destroy the pests in the loosened soil.

12. The method of claim 11 including the step of confining the direction of the microwave energy to the area beneath the microwave generators.

13. The method of claim 12 in which the depth to which the soil is loosened and layered is approximately three inches.

* * * * *